(12) United States Patent
Park et al.

(10) Patent No.: US 9,333,877 B2
(45) Date of Patent: May 10, 2016

(54) METHOD AND APPARATUS FOR CONTROLLING CREEP TORQUE FOR VEHICLE INCLUDING DRIVING MOTOR

(71) Applicant: Hyundai Motor Company, Seoul (KR)

(72) Inventors: Daero Park, Hwaseong (KR); Jaehoon Cho, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/559,074

(22) Filed: Dec. 3, 2014

(65) Prior Publication Data

US 2016/0046205 A1   Feb. 18, 2016

(30) Foreign Application Priority Data

Aug. 18, 2014  (KR) .................. 10-2014-0106922

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 17/00* | (2006.01) | |
| *B60L 15/20* | (2006.01) | |

(52) U.S. Cl.
CPC ......... *B60L 15/2063* (2013.01); *B60L 15/2045* (2013.01)

(58) Field of Classification Search
CPC ..... B60W 20/00; B60W 10/08; B60W 10/06; Y02T 10/6286; B60K 6/445
USPC ........................................... 701/22
See application file for complete search history.

(56) References Cited

FOREIGN PATENT DOCUMENTS

| | | | |
|---|---|---|---|
| JP | 2006-298064 A | 11/2006 | |
| JP | 2007-097250 A | 4/2007 | |
| KR | 10-2013-0136780 A | 12/2013 | |

*Primary Examiner* — Maceeh Anwari
(74) *Attorney, Agent, or Firm* — Mintz Levin Cohn Ferris Glovsky and Popeo, P.C.; Peter F. Corless

(57) ABSTRACT

A method of controlling a creep torque of a vehicle includes: determining whether the vehicle is in a creep driving state based on an accelerator pedal position value; determining whether a vehicle speed is greater than a set vehicle speed; determining at a first time whether a deceleration condition is satisfied when the vehicle speed is greater than the set vehicle speed; when the deceleration condition is satisfied at the first time, storing a first time at which the deceleration condition is satisfied and determining whether a deceleration release condition is satisfied; when it is determined that the deceleration release condition is satisfied, determining at a second time whether the deceleration condition is satisfied; and when it is determined that the deceleration condition is satisfied at the second time, storing the second time at which the deceleration condition is satisfied.

21 Claims, 7 Drawing Sheets

METHOD AND APPARATUS FOR CONTROLLING CREEP TORQUE FOR VEHICLE INCLUDING DRIVING MOTOR

CROSS-REFERENCE TO RELATED APPLICATION

This application claims priority to and the benefit of Korean Patent Application No. 10-2014-0106922 filed in the Korean Intellectual Property Office on Aug. 18, 2014, the entire contents of which are incorporated herein by reference.

BACKGROUND (a) Technical Field

The present disclosure relates to a method and an apparatus of controlling a creep torque for a vehicle including a driving motor, and more particularly, to a method and an apparatus of controlling a creep torque for a vehicle including a driving motor capable of outputting a creep torque suitable for a driving tendency of a driver.

(b) Description of the Related Art

Generally, hybrid electric vehicles, electric vehicles, and fuel cell vehicles, which are considered environmentally-friendly vehicles, are driven by a driving motor obtaining a rotating force via electric energy. In particular, a hybrid electric vehicle efficiently combines the power of an internal combustion engine with the power of the driving motor.

A hybrid electric vehicle generally uses an engine, a driving motor, an engine clutch controlling power between the engine and the driving motor, a transmission, a differential gear apparatus, a battery, an integrated starter and generator (ISG) to start the engine or generate power by an output of the engine, and a wheel. The integrated starter & generator may be referred to as a hybrid starter & generator (HSG). The hybrid electric vehicle provides various driving modes, such as i) an electric vehicle (EV) mode which uses only the power of the driving motor by coupling or releasing the engine clutch depending on the driver's acceleration and deceleration, a vehicle speed, a state of charge (SOC) of a battery, and the like, ii) a hybrid electric vehicle (HEV) mode which uses a torque of the driving motor as auxiliary power while using a torque of the engine as main power, and iii) a regenerative braking mode which recovers braking and inertial energy generated when the vehicle is driven by braking or inertia by power generation of the driving motor and which charges (i.e., stores) the recovered braking and inertial energy in a battery. The hybrid electric vehicle also use mechanical energy of the engine and electrical energy of the battery together, use an optimal operational range of the engine and the driving motor, and recover energy at the time of braking to be able to improve fuel efficiency and use efficient energy.

Furthermore, with respect to the hybrid electric vehicle, creep torque control process refers to a control of the driving motor which is performed in a creep driving state (i.e., state in which an accelerator pedal is not pressed). According to existing conventional creep torque control processes, the creep torque is controlled based on a predetermined creep torque map independent of the driver's tendency.

In this regard, FIG. 7 is a diagram illustrating the existing creep torque map. As shown in FIG. 7, the creep based depending on the vehicle speed is set in the creep torque map so that the hybrid electric vehicle may perform creep driving. The existing creep torque map is fixed.

Acceleration of the hybrid electric vehicle while creep driving is changed depending on loads (e.g., gradient of a road, weight of the hybrid electric vehicle, and the like) applied to the hybrid electric vehicle. When the hybrid electric vehicle is going downhill, the vehicle speed reaches a target vehicle speed (i.e., a driver-desired vehicle speed) relatively quickly, and thus, the driver quickly steps on the brake. Conversely, when the hybrid electric vehicle is going uphill, the vehicle speed reaches the target vehicle speed relatively slowly, and thus, the driver either steps on the brake slowly or does not step on the brake at all.

In particular, when the driver frequently steps on the brake while creep driving, it may be determined that unwanted extra creep torque is being generated. In this case, only a high torque region (R) of the creep torque map is used, and the extra creep torque is lost as heat energy through operation of the brake, thereby deteriorating fuel efficiency. This problem also occurs while the hybrid electric vehicle is driving on a congested road (e.g., in traffic) or is parked.

The above information disclosed in this Background section is only for enhancement of understanding of the background of the disclosure and therefore may contain information that does not form the related art that is already known in this country to a person of ordinary skill in the art.

SUMMARY

The present disclosure has been made in an effort to provide an apparatus and a method of controlling a creep torque for a vehicle including a driving motor having advantages of outputting a creep torque suitable for the driving tendencies or preferences of the driver, thus improving fuel efficiency.

Embodiments of the present disclosure provide a method for controlling a creep torque of a vehicle including a driving motor, including: determining whether the vehicle is in a creep driving state based on an accelerator pedal position value; determining whether a vehicle speed is greater than a set vehicle speed; determining at a first time whether a deceleration condition is satisfied when the vehicle speed is greater than the set vehicle speed; when it is determined that the deceleration condition is satisfied at the first time, storing the first time at which the deceleration condition is satisfied and determining whether a deceleration release condition is satisfied; when it is determined that the deceleration release condition is satisfied, determining at a second time whether the deceleration condition is satisfied; when it is determined that the deceleration condition is satisfied at the second time, storing the second time at which the deceleration condition is satisfied; comparing an amount of time elapsed from the first time to the second time with a reference time; when the amount of time elapsed is less than the reference time, calculating a derating factor; and correcting a creep torque map by applying the derating factor.

The deceleration condition may be satisfied when a brake pedal position value exceeds a set brake pedal position value.

The deceleration release condition may be satisfied when the brake pedal position value is equal to the set brake pedal position value.

The deceleration condition may be satisfied when the brake pedal position value exceeds the set brake pedal position value and an acceleration of the vehicle is equal to or less than a set acceleration.

The deceleration release condition may be satisfied when the brake pedal position value is equal to the set brake pedal position value, and the acceleration of the vehicle exceeds the set acceleration.

The correcting of the creep torque map may include: determining whether the derating factor is applied by dividing a region of the creep torque map into at least one subregion.

The method may further include: storing a first vehicle speed at the first time; and storing a second vehicle speed at the second time, wherein the derating factor is calculated based on the first vehicle speed and the second vehicle speed.

The derating factor may be a value obtained by dividing an average of the first vehicle speed and the second vehicle speed by a reference vehicle speed.

The correcting of the creep torque map may further include: dividing a region of the creep torque map into at least one subregion and applying the derating factor to a subregion of the at least one subregion which is equal to or greater than the first vehicle speed.

The method may further include: calculating the creep torque using the corrected creep torque map; and controlling the driving motor to output the creep torque.

Further, embodiments of the present disclosure provide an apparatus for controlling a creep torque of a vehicle including a driving motor, including: a data detector configured to detect data for controlling the creep torque for the vehicle; a driving motor configured to output the creep torque; and a controller configured to determine whether the vehicle is in a creep driving state based on an electrical signal received from the data detector and to control the driving motor using a creep torque map, wherein the controller: i) stores a first time at which a deceleration condition is satisfied when the deceleration condition is satisfied and determines whether a deceleration release condition is satisfied at the first time, ii) determines at a second time whether the deceleration condition is satisfied when the deceleration release condition is satisfied, iii) stores the second time at which the deceleration condition is satisfied when the deceleration condition is satisfied, iv) calculates a derating factor when an amount of time elapsed from the first time to the second time is less than a reference time, and v) corrects the creep torque map by applying the derating factor.

The deceleration condition may be satisfied when a brake pedal position value exceeds a set brake pedal position value.

The deceleration release condition may be satisfied when the brake pedal position value is equal to the set brake pedal position value.

The deceleration condition may be satisfied when the brake pedal position value exceeds the set brake pedal position value and an acceleration of the vehicle is equal to or less than a set acceleration.

The deceleration release condition may be satisfied when the brake pedal position value is equal to the set brake pedal position value, and the acceleration of the vehicle exceeds the set acceleration.

The controller may determine whether a derating factor is applied by dividing a region of the creep torque map into at least one subregion.

The controller may store a first vehicle speed at the first time, store a second vehicle speed at a second time and calculate the derating factor based on the first vehicle speed and the second vehicle speed.

The controller may calculate the derating factor by dividing an average of the first vehicle speed and the second vehicle speed by a reference vehicle speed.

The controller may divide a region of the creep torque map into at least one subregion and apply the derating factor to a subregion of the at least one subregion which is equal to or greater than a first vehicle speed.

The data detector may include: an accelerator pedal position detector configured to detect an accelerator pedal position value; a brake pedal position detector configured to detect a brake pedal position value; and a vehicle speed detector configured to detect a vehicle speed, wherein the controller may calculate an acceleration of the vehicle by differentiating the vehicle speed.

Further, embodiments of the present disclosure provide a non-transitory computer readable medium containing program instructions for controlling a creep torque of a vehicle including a driving motor, the computer readable medium including: program instructions that determine whether the vehicle is in a creep driving state based on an accelerator pedal position value; program instructions that determine whether a vehicle speed is greater than a set vehicle speed; program instructions that determine at a first time whether a deceleration condition is satisfied when the vehicle speed is greater than the set vehicle speed; program instructions that store the first time at which the deceleration condition is satisfied and determine whether a deceleration release condition is satisfied, when the deceleration condition is satisfied at the first time; program instructions that determine at a second time whether the deceleration condition is satisfied, when the deceleration release condition is satisfied; program instructions that store the second time at which the deceleration condition is satisfied, when the deceleration condition is satisfied at the second time; program instructions that compare an amount of time elapsed from the first time to the second time with a reference time; program instructions that calculate a derating factor, when the amount of time elapsed is less than the reference time; and program instructions that correct a creep torque map by applying the derating factor.

As described above, according to embodiments of the present disclosure, it is possible to correct the creep torque map by calculating the derating factor. Therefore, it is possible to output the creep torque suitable for the driving tendencies of the driver. Further, it is possible to improve the fuel efficiency by preventing the brake pedal from being frequently operated in the creep driving state.

Figure 1:
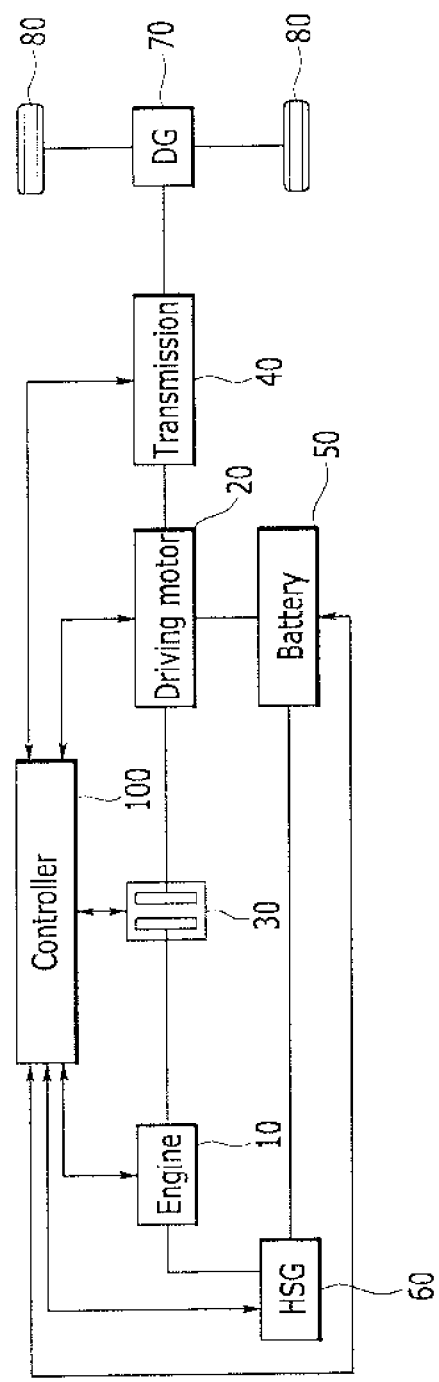
FIG. 1 is a block diagram illustrating a hybrid electric vehicle according to embodiments of the present disclosure.

| <Description of symbols> | |
|---|---|
| 10: Engine | 20: Driving motor |
| 30: Engine clutch | 40: Transmission |
| 50: Battery | 60: Integrated starter & generator |
| 70: Differential gear apparatus | 80: Wheel |
| 90: Data detector | 100: Controller |

DETAILED DESCRIPTION OF THE EMBODIMENTS

Hereinafter, the present disclosure will be described more fully with reference to the accompanying drawings, in which embodiments of the disclosure are shown. In addition, each component illustrated in the drawings is arbitrarily shown for convenience of description, but the present disclosure is not necessarily limited thereto.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the present specification and claims, a vehicle will be understood as meaning a hybrid electric vehicle, an electric vehicle, or a fuel cell vehicle which use power of a driving motor. Hereinafter, the hybrid electric vehicle is mainly described and a driving of the electric vehicle and the fuel cell vehicle by the driving motor is obvious to those skilled in the art and therefore a detailed description thereof will be omitted.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for controlling a creep torque for a vehicle including a driving motor.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a block diagram illustrating a hybrid electric vehicle according to embodiments of the present disclosure.

As illustrated in FIG. 1, a hybrid electric vehicle according to the present disclosure includes an engine 10, a driving motor 20, an engine clutch 30 which controls power between the engine 10 and the driving motor 20, a transmission 40, a battery 50, an integrated starter & generator 60 which starts the engine 10 or generates power by an output of the engine 10, a differential gear apparatus 70, a wheel 80, and a controller 100.

In connection with a power delivery of the hybrid electric vehicle, power generated from the engine 10 or the driving motor 20 is selectively delivered to an input shaft of the transmission 40 and power output from an output shaft of the transmission 40 is delivered to an axle via the differential gear apparatus 70. The axle rotates the wheel 80 to drive the hybrid electric vehicle by the power generated from the engine 10 or the driving motor 20.

The battery 50 may be stored with a high voltage and supplies a driving voltage to the driving motor 20 in an EV mode and an HEV mode and may be charged with electricity recovered through the driving motor 20 in a regenerative braking mode.

The controller 100 controls an output torque of the engine 10 and the driving motor 20 depending on a state of the hybrid electric vehicle and drives the hybrid electric vehicle in the EV mode, the HEV mode, and the regenerative braking mode depending on a driving condition and a state of charge (SOC) of the battery 50.

Figure 2:
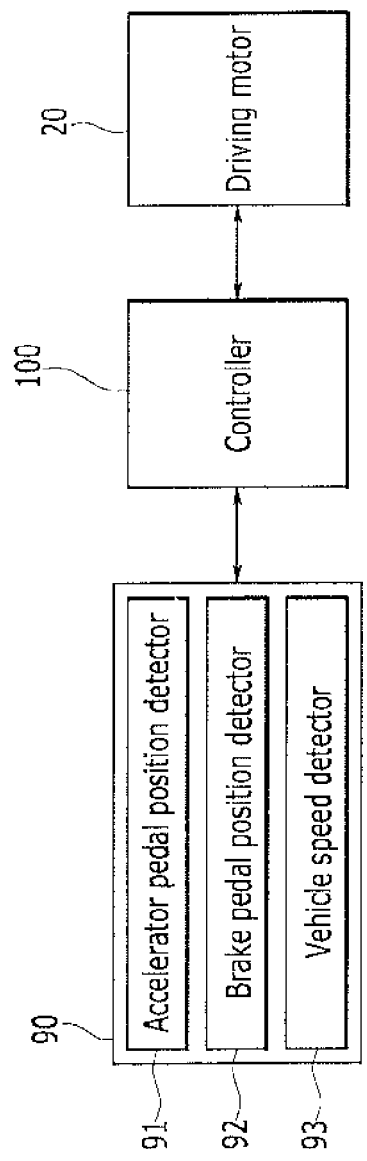
FIG. 2 is a block diagram illustrating an apparatus of controlling a creep torque according to embodiments of the present disclosure.

FIG. 2 is a block diagram illustrating an apparatus of controlling a creep torque according to embodiments of the present disclosure. As illustrated in FIG. 2, the apparatus of controlling a creep torque according to the present disclosure includes the data detector 90, the controller 100, and the driving motor 20. The data detector 90 detects data for controlling the creep torque for the vehicle and delivers the data detected by the data detector 90 to the controller 100.

The data detector 90 may include an accelerator pedal position detector 91, a brake pedal position detector 92, and a vehicle speed detector 93. The accelerator pedal position detector 91 detects an accelerator pedal position value (e.g., how much an accelerator pedal is pressed) and delivers a signal for the accelerator pedal position value to the controller 100. When the accelerator pedal is completely pressed, the accelerator pedal position value is 100% and when the accelerator pedal is not pressed, the accelerator pedal position value is 0%.

The brake pedal position detector 92 detects a brake pedal position value (e.g., how much a brake pedal is pressed) and delivers a signal for the brake pedal position value to the controller 100. When the brake pedal is completely pressed, the brake pedal position value is 100%, and when the brake pedal is not pressed, the brake pedal position value is 0%.

The vehicle speed detector 93 detects a vehicle speed and delivers a signal for the vehicle speed to the controller 100. The vehicle speed detector 93 may be mounted on a wheel of the vehicle. The controller 100 may calculate an acceleration of the vehicle by differentiating the vehicle speed.

The controller 100 may be implemented with at least one microprocessor executed by a predetermined program. The predetermined program may include a series of instructions for performing each step included in a method of controlling a creep torque for a vehicle including a driving motor 20 according to embodiments of the present disclosure to be described below.

The controller 100 may control the driving motor 20 based on an electrical signal received from the data detector 90. In particular, when the vehicle is in a creep driving state, the controller 100 controls the driving motor 20 to output the creep torque.

Hereinafter, referring to FIGS. 3 to 6, the method of controlling a creep torque for a vehicle including a driving motor according to embodiments of the present disclosure will be described in detail.

Figure 3:
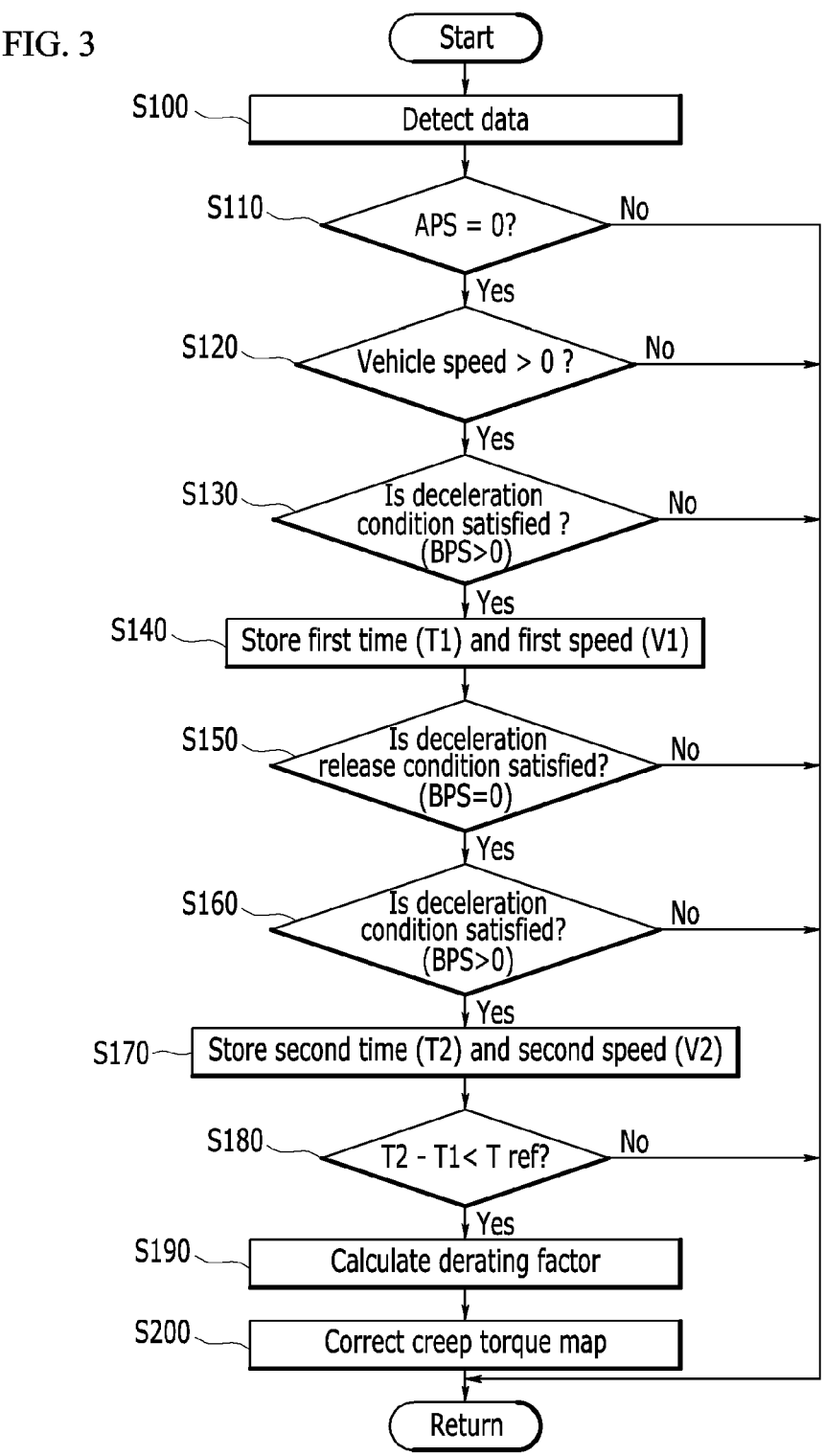
FIG. 3 is a flow chart of a method for correcting a creep torque map according to embodiments of the present disclosure.
Figure 4:
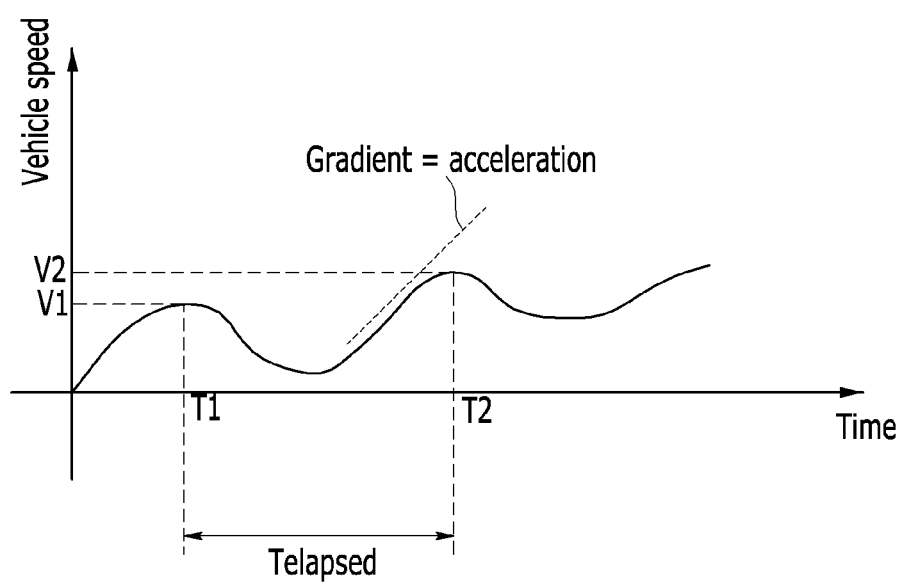
FIG. 4 is a graph illustrating a change in a vehicle speed in a creep driving state according to embodiments of the present disclosure.
Figure 5:
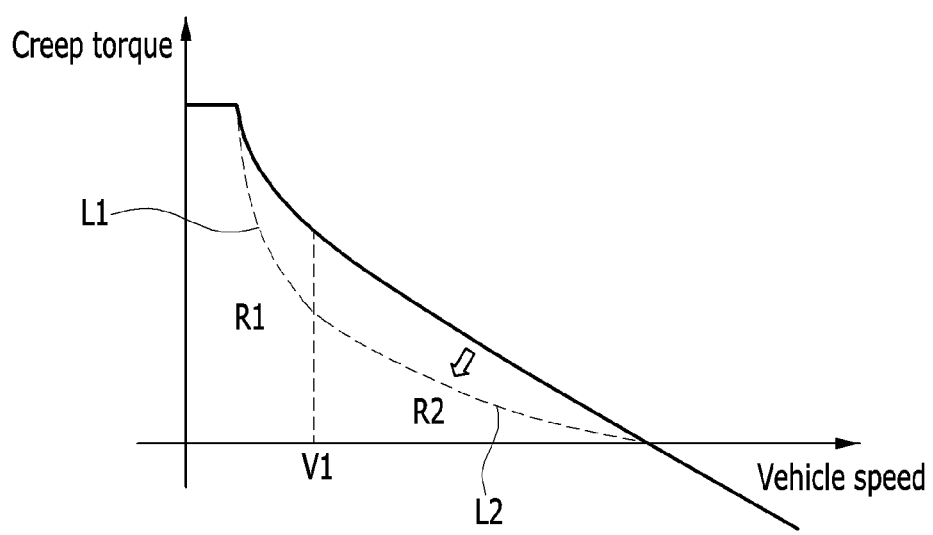
FIG. 5 is a diagram illustrating the creep torque map according to embodiments of the present disclosure.

FIG. 3 is a flow chart of a method for correcting a creep torque map according to embodiments of the present disclosure, FIG. 4 is a graph illustrating a change in a vehicle speed in a creep driving state according to embodiments of the present disclosure, and FIG. 5 is a diagram illustrating the creep torque map according to embodiments of the present disclosure.

As illustrated in FIG. 3, a method for correcting a creep torque map according to embodiments of the present disclosure begins with detecting data for controlling a creep torque (S100).

That is, the accelerator pedal position detector 91 detects the accelerator pedal position value, the brake pedal position detector 92 detects the brake pedal position value, and the vehicle speed detector 93 detects the vehicle speed. Further, the controller 100 may calculate an acceleration of the vehicle by differentiating the vehicle speed.

The controller 100 determines whether the vehicle is in the creep driving state based on the accelerator pedal position value (S110). When the accelerator pedal position value is 0%, the controller 100 may determine that the vehicle is in the creep driving state.

In step S110, when the vehicle is not in the creep driving state, the controller 100 finishes the method for correcting a creep torque map according to the present disclosure.

In step S110, when the vehicle is in the creep driving state, the controller 100 determines whether the vehicle speed is greater than a set vehicle speed (S120). The set vehicle speed may be set to be a value determined as being preferred by those skilled in the art and, for example, may be 0 KPH.

In step S120, when the vehicle speed is 0 KPH, the controller 100 finishes the method for correcting a creep torque map according to the present disclosure.

In step S120, when the vehicle speed is greater than the set vehicle speed, the controller 100 determines whether a deceleration condition is satisfied (S130). The deceleration condition may be satisfied when the brake pedal position value exceeds a set brake pedal position value. The set brake pedal position value may be set to be a value determined as being preferred by those skilled in the art and, for example, may be 0%. Unlike this, the deceleration condition may be satisfied when the brake pedal position value exceeds the set brake pedal position value and the acceleration of the vehicle is equal to or less than a set acceleration. In this case, the vehicle deceleration may be more accurately determined. The set acceleration may be set to be a value determined as being preferred by those skilled in the art and, for example, may be 0 KPH/sec.

In step S130, when the deceleration condition is not satisfied, the controller 100 finishes the method for correcting a creep torque map according to the present disclosure.

In step S130, when the deceleration condition is satisfied, as illustrated in FIG. 4, the controller 100 stores a first time T1 and a first vehicle speed V1 at which the deceleration condition is satisfied (S140).

Next, the controller 100 determines whether a deceleration release condition is satisfied (S150). The deceleration release condition may be satisfied when the brake pedal position value is the set brake pedal position value. Unlike this, the deceleration release condition may be satisfied when the brake pedal position value is the set brake pedal position value and the acceleration of the vehicle exceeds the set acceleration. In this case, it may be more accurately determined that the vehicle deceleration is released.

In step S150, when the deceleration release condition is not satisfied, the controller 100 finishes the method for correcting a creep torque map according to the present disclosure.

In step S150, when the deceleration release condition is satisfied, the controller 100 again determines whether the deceleration condition is satisfied (S160).

In step S160, when the deceleration condition is not again satisfied, the controller 100 finishes the method for correcting a creep torque map according to the present disclosure.

In step S160, when the deceleration condition is again satisfied, as illustrated in FIG. 4, the controller 100 stores a second time T2 and a second vehicle speed V2 at which the deceleration condition is again satisfied (S170).

The controller 100 compares an elapsed time Telapsed from the first time T1 to the second time T2 with a reference time Tref (S180). The reference time Tref is a reference to determine whether the brake pedal is frequently operated in the creep driving state and may be set to be a value determined as being preferred by those skilled in the art.

In step S180, when the elapsed time Telapsed is equal to or greater than the reference time Tref, the controller 100 finishes the method for correcting a creep torque map according to the present disclosure. In this case, it may be determined that there is no need to correct the creep torque map like the following two cases. When a difference between the first vehicle speed V1 and the second vehicle speed V2 is small, a load applied to the vehicle is large and thus the high creep torque is required. When the difference between the first vehicle speed V1 and the second vehicle speed V2 is large, the driver determines that the current creep torque is appropriate.

In step S180, when the elapsed time Telapsed is less than the reference time Tref, the controller 100 calculates a derating factor (S190). That is, since it is determined that the brake pedal is frequently operated, there is a need to correct the creep torque map. The derating factor may be a value which is greater than 0 and equal to or less than 1. The derating factor may be a value obtained by dividing an average of the first vehicle speed V1 and the second vehicle speed V2 by a reference vehicle speed Vref. The reference vehicle speed Vref may be set to be a value determined as being preferred by those skilled in the art and, for example, may be a maximum speed of the vehicle when the vehicle is driven in the creep driving state on a plain road. The present specification exemplifies that the derating factor is calculated using the reference vehicle speed Vref, but is not limited thereto, and therefore, the derating factor may be calculated by various methods based on the first vehicle speed V1 and the second vehicle speed V2.

Next, the controller 100 applies the derating factor to correct the creep torque map (S200). The controller 100 may apply the derating factor to the entire region of the creep torque map. Unlike this, the controller 100 may divide the region of the creep torque map into at least one subregion to be able to determine whether the derating factor is applied. For example, as illustrated in FIG. 5, the controller 100 applies the derating factor only to a subregion R2 which is equal to or greater than the first vehicle speed V1 to be able to correct the creep torque map. In this case, the controller 100 may correct the creep torque map so that a creep torque line L1 corresponding to a subregion R1 which is less than the first vehicle speed V1 is connected to a creep torque line L2 to which the derating factor is applied. The present specification exemplifies that the subregion is divided into the two subregions R1 and R2 based on the first vehicle speed V1, but is not limited thereto.

Figure 6:
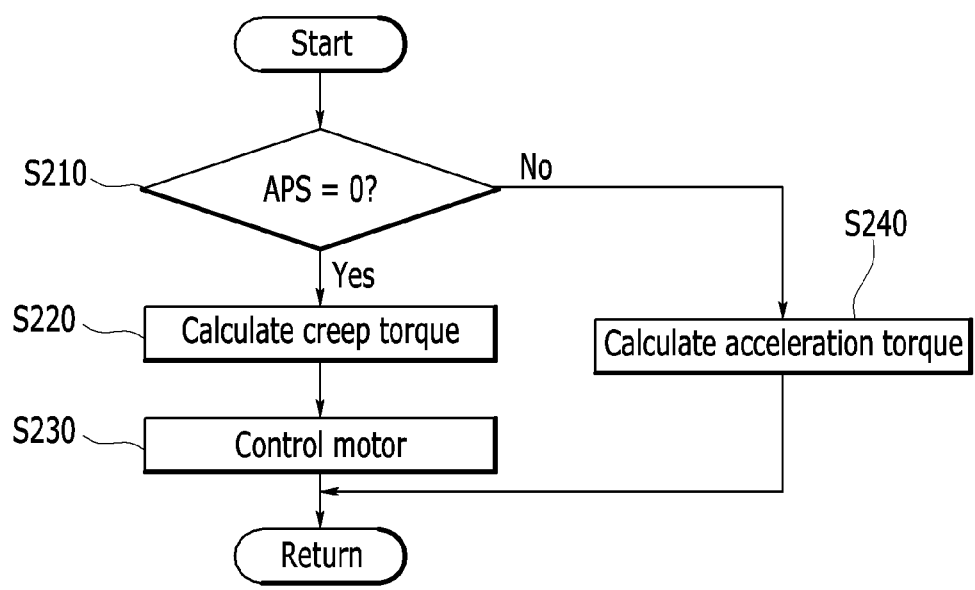
FIG. 6 is a flow chart of a method for outputting a creep torque according to embodiments of the present disclosure.
Figure 7:
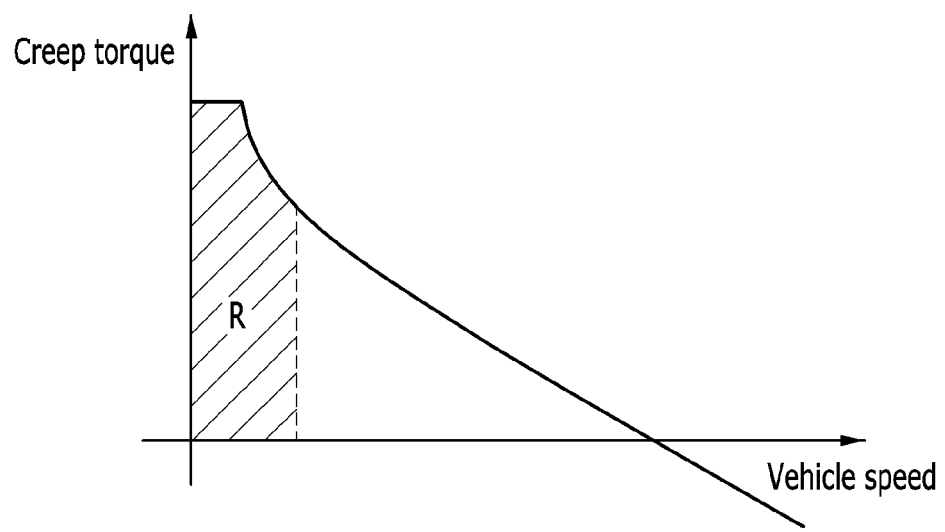
FIG. 7 is a diagram illustrating a conventional creep torque map.

FIG. 6 is a flow chart of a method for outputting a creep torque according to embodiments of the present disclosure.

As illustrated in FIG. 6, the controller 100 determines whether the vehicle is in the creep driving state based on the accelerator pedal position value (S210). When the accelerator pedal position value is 0%, the controller 100 may determine that the vehicle is in the creep driving state.

In step S210, when the accelerator pedal position value is not 0%, the controller 100 calculates an acceleration torque based on the vehicle speed and the accelerator pedal position value (S240). Next, the controller 100 controls the driving motor 20 to output the acceleration torque. In particular, in the case of the hybrid electric vehicle, the controller 100 controls the engine 10 and/or the driving motor 20 to output the acceleration torque.

In step S200, when the vehicle is in the creep driving state, the controller 100 uses the corrected creep torque map to calculate the creep torque (S210). Next, the controller 100 controls the driving motor 20 to output the creep torque.

As described above, according to embodiments of the present disclosure, it is possible to correct the creep torque map by calculating the derating factor. Therefore, it is possible to output the creep torque suitable for the driving tendencies and/or preferences of the driver. Further, it is possible to improve the fuel efficiency by preventing the brake pedal from being frequently operated in the creep driving state.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A method for controlling a creep torque of a vehicle including a driving motor, comprising:
   determining, by a controller, whether the vehicle is in a creep driving state based on an accelerator pedal position value;
   determining, by a controller, whether a vehicle speed is greater than a set vehicle speed;
   determining, by a controller, at a first time whether a deceleration condition is satisfied when the vehicle speed is greater than the set vehicle speed;
   when the deceleration condition is satisfied at the first time, storing, by a controller, the first time at which the deceleration condition is satisfied and determining whether a deceleration release condition is satisfied;
   when the deceleration release condition is satisfied, determining, by a controller, at a second time whether the deceleration condition is satisfied;
   when the deceleration condition is satisfied at the second time, storing, by a controller, the second time at which the deceleration condition is satisfied;
   comparing, by a controller, an amount of time elapsed from the first time to the second time with a reference time;
   when the amount of time elapsed is less than the reference time, calculating, by a controller, a derating factor; and
   correcting, by a controller, a creep torque map by applying the derating factor.

2. The method of claim 1, wherein the deceleration condition is satisfied when a brake pedal position value exceeds a set brake pedal position value.

3. The method of claim 2, wherein the deceleration release condition is satisfied when the brake pedal position value is equal to the set brake pedal position value.

4. The method of claim 1, wherein the deceleration condition is satisfied when a brake pedal position value exceeds a set brake pedal position value, and an acceleration of the vehicle is equal to or less than a set acceleration.

5. The method of claim 4, wherein the deceleration release condition is satisfied when the brake pedal position value is equal to the set brake pedal position value, and the acceleration of the vehicle exceeds the set acceleration.

6. The method of claim 1, wherein the correcting of the creep torque map includes:
   determining, by a controller, whether the derating factor is applied by dividing a region of the creep torque map into at least one subregion.

7. The method of claim 1, further comprising:
   storing, by a controller, a first vehicle speed at the first time; and
   storing, by a controller, a second vehicle speed at the second time,
   wherein the derating factor is calculated based on the first vehicle speed and the second vehicle speed.

8. The method of claim 7, wherein the derating factor is a value obtained by dividing an average of the first vehicle speed and the second vehicle speed by a reference vehicle speed.

9. The method of claim 7, wherein:
   the correcting of the creep torque map further includes:
   dividing, by a controller, a region of the creep torque map into at least one subregion; and
   applying, by a controller, the derating factor to a subregion of the at least one subregion which is equal to or greater than the first vehicle speed.

10. The method of claim 1, further comprising:
    calculating, by a controller, the creep torque using the corrected creep torque map; and
    controlling, by a controller, the driving motor to output the creep torque.

11. An apparatus for controlling a creep torque of a vehicle including a driving motor, comprising:
    a data detector configured to detect data for controlling the creep torque for the vehicle;
    a driving motor configured to output the creep torque; and
    a controller configured to determine whether the vehicle is in a creep driving state based on an electrical signal received from the data detector and to control the driving motor using a creep torque map,
    wherein the controller: i) stores a first time at which a deceleration condition is satisfied when the deceleration condition is satisfied at the first time and determines whether a deceleration release condition is satisfied, ii) determines at a second time whether the deceleration condition is satisfied when the deceleration release condition is satisfied, iii) stores the second time at which the deceleration condition is satisfied when the deceleration condition is satisfied, iv) calculates a derating factor when an amount of time elapsed from the first time to the second time is less than a reference time, and v) corrects the creep torque map by applying the derating factor.

12. The apparatus of claim 11, wherein the deceleration condition is satisfied when a brake pedal position value exceeds a set brake pedal position value.

13. The apparatus of claim 12, wherein the deceleration release condition is satisfied when the brake pedal position value is equal to the set brake pedal position value.

14. The apparatus of claim 11, wherein the deceleration condition is satisfied when a brake pedal position value exceeds a set brake pedal position value, and an acceleration of the vehicle is equal to or less than a set acceleration.

15. The apparatus of claim 14, wherein the deceleration release condition is satisfied when the brake pedal position value is equal to the set brake pedal position value, and the acceleration of the vehicle exceeds the set acceleration.

16. The apparatus of claim 11, wherein the controller determines whether the derating factor is applied by dividing a region of the creep torque map into at least one subregion.

17. The apparatus of claim 11, wherein the controller stores a first vehicle speed at the first time, stores a second vehicle speed at the second time and calculates the derating factor based on the first vehicle speed and the second vehicle speed.

18. The apparatus of claim 17, wherein the controller calculates the derating factor by dividing an average of the first vehicle speed and the second vehicle speed by a reference vehicle speed.

19. The apparatus of claim 17, wherein the controller divides a region of the creep torque map into at least one subregion and applies the derating factor to a subregion of the at least one subregion which is equal to or greater than the first vehicle speed.

20. The apparatus of claim 11, wherein the data detector includes:
- an accelerator pedal position detector configured to detect an accelerator pedal position value;
- a brake pedal position detector configured to detect a brake pedal position value; and
- a vehicle speed detector configured to detect a vehicle speed, wherein
- the controller calculates an acceleration of the vehicle by differentiating the vehicle speed.

21. A non-transitory computer readable medium containing program instructions for controlling a creep torque of a vehicle including a driving motor, the computer readable medium comprising:
- program instructions that determine whether the vehicle is in a creep driving state based on an accelerator pedal position value;
- program instructions that determine whether a vehicle speed is greater than a set vehicle speed;
- program instructions that determine at a first time whether a deceleration condition is satisfied when the vehicle speed is greater than the set vehicle speed;
- program instructions that store the first time at which the deceleration condition is satisfied and determine whether a deceleration release condition is satisfied, when the deceleration condition is satisfied at the first time;
- program instructions that determine at a second time whether the deceleration condition is satisfied, when the deceleration release condition is satisfied;
- program instructions that store the second time at which the deceleration condition is satisfied, when the deceleration condition is satisfied at the second time;
- program instructions that compare an amount of time elapsed from the first time to the second time with a reference time;
- program instructions that calculate a derating factor, when the amount of time elapsed is less than the reference time; and
- program instructions that correct a creep torque map by applying the derating factor.

* * * * *